United States Patent [19]

Kraft

[11] Patent Number: 5,775,392
[45] Date of Patent: Jul. 7, 1998

[54] MOTOR VEHICLE TANK WITH FILLING TUBE VENT

[75] Inventor: Burkhard Kraft, Isenbüttel, Germany

[73] Assignee: Volkswage AG, Wolfsburg, Germany

[21] Appl. No.: 734,486

[22] Filed: Oct. 21, 1996

[30] Foreign Application Priority Data

Oct. 24, 1995 [DE] Germany .......... 195 39 455.0

[51] Int. Cl.[6] ................................................ B60K 15/0356
[52] U.S. Cl. ................. 141/382; 141/59; 141/326; 220/86.2
[58] Field of Search ................... 141/59, 312, 326, 141/382; 220/86.1, 86.2

[56] References Cited

U.S. PATENT DOCUMENTS

| | | | |
|---|---|---|---|
| 4,441,533 | 4/1984 | Snyder et al. | 141/59 |
| 4,747,508 | 5/1988 | Sherwood | 141/326 X |
| 5,205,330 | 4/1993 | Sekine | 141/59 |
| 5,297,595 | 3/1994 | Haile et al. | 141/59 |

*Primary Examiner*—J. Casimer Jacyna
*Attorney, Agent, or Firm*—Baker & Botts, L.L.P.

[57] ABSTRACT

In the particular embodiments described in the specification, a motor vehicle tank has a filling tube with a vent orifice connected to a device for adsorbing fuel vapors and a sealing arrangement including two annular lips spaced on opposite sides of the vent orifice and arranged to sealingly engage a filling pump nozzle to seal off the orifice from the fuel tank and from the atmosphere during filling of the tank.

9 Claims, 2 Drawing Sheets

5,775,392

MOTOR VEHICLE TANK WITH FILLING TUBE VENT

BACKGROUND OF THE INVENTION

This invention relates to motor vehicle tanks having a filling vent in a tank filling neck.

Modern motor vehicle tanks for liquid fuels have leakproof tank filler caps and are provided with filling tube vents to avoid emission of vapors from the motor vehicle tank. The filling tube vents are usually connected to an activated-charcoal filter, the function of which is to adsorb fuel vapors produced within the motor vehicle tank, particularly when the motor vehicle is stationary, so that no fuel vapors escape from the motor vehicle tank into the atmosphere. During refuelling, the filling tube vent is normally closed or substantially closed so as not to saturate the activated-charcoal filter too heavily with fuel vapors and also to prevent complete filling of the tank. Despite closing of the vent, the fuel vapors produced in the tank normally do not escape into the atmosphere since modern pump nozzles are provided with a vapor extraction arrangement, or, in the United States, the vapors are temporarily stored in the activated-charcoal container. Preventing complete filling is necessary to make certain that the tank does not overflow if the fuel expands as a result of a high ambient temperature, the filling limit of the tank being determined by the filling tube vent line level.

Closing of the filling tube vent of the tank during refuelling is usually achieved by providing a valve in the filling tube neck near the filler cap. The valve is arranged as a tilt valve and is actuated by the tank filler cap, that is to say, it is opened when the tank filler cap is closed. By removing the tank filler cap, the tilt valve automatically assumes its closed position. A disadvantage of this arrangement is that the valve usually contains metals which have to be removed when the tank is recycled. In addition, the valve requires a relatively large space.

SUMMARY OF THE INVENTION

An object of the present invention is to provide a motor vehicle tank with a filling tube vent which overcomes the disadvantages of the prior art.

Another object of the present invention is to provide a motor vehicle tank having a filling tube vent valve arrangement which may be made entirely of plastic and which can be removed easily for recycling and requires only a small space.

These and other objects of the invention are attained by providing a motor vehicle fuel tank with a filling tube having a vent which is arranged to be closed by introduction of a fuel pump nozzle into the filling tube of the tank.

Thus, the motor vehicle tank of the invention has a tank filling tube in which a tank vent is located and, during refuelling, the tank vent is essentially closed, at least to the extent that a dynamic pressure is built up in the tank vent as a result of the fuel flowing into the tank. This closure is provided at least relative to the atmosphere, and usually the closure also is effective with respect to the tank interior. Because closing of the tank vent is effected by introduction of the pump nozzle into the tank filling tube, the automatic closing valve arrangements of the prior art are no longer necessary. Closing of the vent by the pump nozzle can take place, for example, by motion of a lever which is arranged in the tank filling tube and is pushed sideways by the pump nozzle. Advantageously, however, closure may be effected by a sealing lip which is located in the tank filling tube and which sealingly engages the outer surface of the pump nozzle when it is introduced so as to seal the tube relative to the atmosphere. For this purpose, the sealing lip preferably has an annular configuration which matches the diameter of the outer surface of the pump nozzle. Particularly simple closure is thereby achieved. In an especially advantageous embodiment, two such annular sealing lips, which are spaced from each other, are provided. Both sealing lips sealingly engage the pump nozzle so that an annular cavity between the sealing lips, which are connected to one another, is closed by the pump nozzle. The vent orifice of the tank filling tube vent is connected to this annular cavity so that, when the pump nozzle is introduced, the tank vent is closed and, when the pump nozzle is removed and the filling tube cap is in place the tank vent is open. As a result, during refuelling the tank vent and the tank filling tube itself are closed in a simple way. At the same time, however, tank-venting during refuelling can take place, for example, through the pump nozzle.

In a preferred embodiment, the sealing lip or lips may be arranged on a sealing element, which can be of multi-part design, having dimensions such as to fit the tank filling tube so that it can simply be pushed into the tube and preferably locked therein. This allows simple manufacture and assembly of the filling tube vent for the tank.

The invention also encompasses a motor vehicle tank with a tank filling tube which contains a receptacle, into which a sealing element having at least one, preferably two, sealing lips can be inserted, in order to effect the above-described closing of the filling tube vent.

The invention also relates to the provision of a sealing element having at least one sealing lip, preferably two sealing lips, which sealingly engage a pump nozzle and which may be inserted into a tank filling tube having a tank vent in order to bring about the above-described closure.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
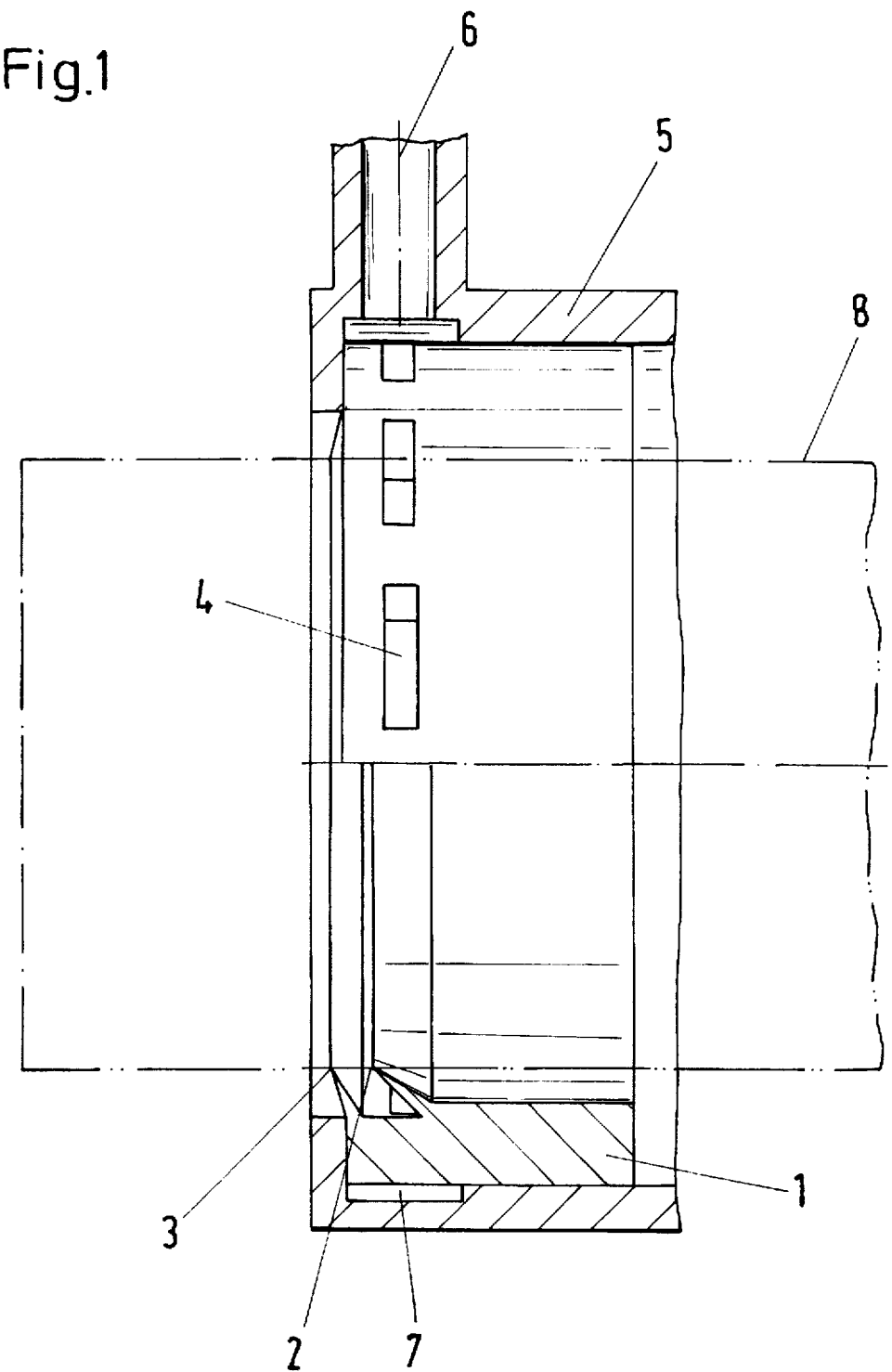
FIG. 1 is a fragmentary sectional view showing a representative embodiment of a sealing element in a tank filling tube in accordance with the invention.
Figure 2:
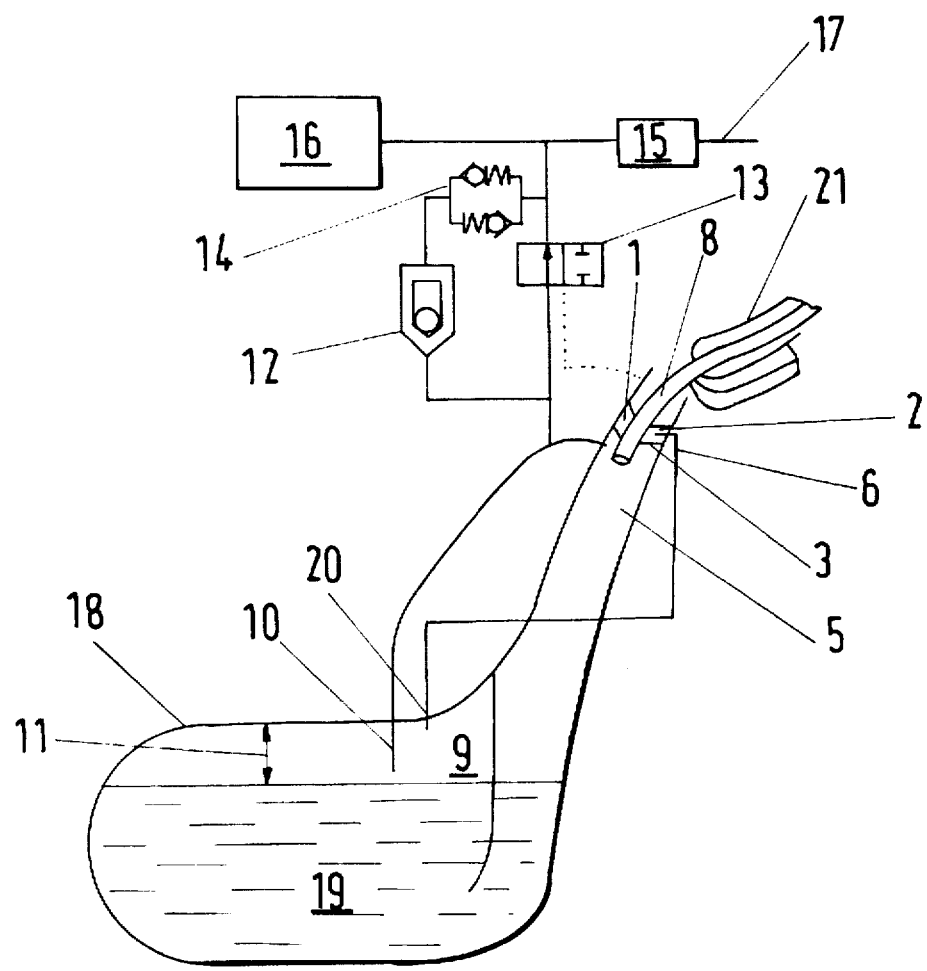
FIG. 2 is a schematic diagram showing the sealing element of FIG. 1 in a typical motor vehicle fuel tank arranged in accordance with the invention.

In a typical embodiment of the invention shown in the drawings, a connection line 6 for a tank service vent arrangement 20 is formed in a tank filling tube 5 which is connected, as shown in FIG. 2, to the bottom portion of a motor vehicle tank 18. The connection line 6 is connected to a hose which opens at its other end into the service vent 20 in the upper portion of the tank 18. As shown, in FIG. 1, the connection line 6 opens into an annular groove 7 which is closed off relative to the inside of the filling tube 5 by a sealing element 1. Formed around the circumference of the sealing element 1 are ventilation slots 4 through which fuel vapors can escape from the tank filling tube 5 into the annular groove 7 and from there through the connection line 6 and the hose into the upper portion of the tank 18 and vice-versa.

Also formed in the sealing element 1, in front of and behind the ventilation slots 4, are a first sealing lip 2 and a second sealing lip 3 which, during refuelling, sealingly engage the outer surface 8 of a pump nozzle 21. The ventilation slots 4 in the filling tube are thereby closed to the atmosphere and to the tank filling tube 5 so that the service vent 20 is also closed from the tank filling tube 5. Since the hose from the upper portion of the tank interior 9 is closed at the same time, the fuel vapors displaced in the tank 18 during refuelling are discharged in a controlled manner through a refuelling vent 10. Moreover, the refuelling vent 10 is arranged in such a way that the tank 18 can be filled only up to a selected level 11 above which the fuel 19 may expand when there is an increase in temperature. The refuelling vent 10 is connected to the tank filling tube 5, to a check valve 12 and to a switching valve 13 which is switched by a tank filler cap (not shown) in such a way that the switching valve is open when the tank filler cap is removed and is closed when the tank filler cap is screwed in. The check valve 12 is connected at its other end to a pressure-holding valve 14 which is in turn connected to the outlet of the switching valve 13, to an adsorber 15 containing activated-charcoal and to the intake side of an internal combustion engine 16. The pressure-holding valve 14 is open in both directions on the tank side i.e., toward the check valve 12, that is to say it opens in the event of either an underpressure or an overpressure in the tank 18. The other end of the pressure-holding valve 14, which is connected to the intake side of the engine 16, remains closed in the event of an underpressure at the intake side.

This arrangement assures that, during refuelling, the service vent 20 is closed, so that the tank interior 9 is vented only through the refuelling vent 10 by way of the outlet 17 of the adsorber 15 which is open to the atmosphere. As soon as the tank 18 is refuelled up to the refuelling vent line 10, the fuel 19 rises in the tank filling tube 5 as far as the end of the pump nozzle 21, with the result that the refuelling operation is discontinued. By closing the tank filling tube 5, tank ventilation and venting takes place through the check valve 12 and the pressure holding valve 14.

Although the invention has been described herein with reference to specific embodiments, many modifications and variations therein will readily occur to those skilled in the art. Accordingly, all such variations and modifications are included within the intended scope of the invention.

I claim:

1. A motor vehicle tank comprising:

a tank having a tank filling tube;

a tank vent having a vent orifice in the tank filling tube;

a connection line which connects the vent orifice with an upper portion of the tank and can be isolated from the tank filling tube; and a closing arrangement for closing the vent orifice in the tank filling tube during filling and responsive to introduction of a pump nozzle into the tank filling tube for closing the tank filling tube with respect to the atmosphere and isolating the connection line from the tank filling tube when the motor vehicle tank is being filled by introduction of a fuel pump nozzle into the tank filling tube.

2. A motor vehicle tank according to claim 1 wherein the closing arrangement includes a sealing lip which engages the pump nozzle so as to seal off the vent orifice with respect to the atmosphere.

3. A motor vehicle tank according to claim 2 wherein the sealing lip has an annular shape.

4. A motor vehicle tank according to claim 2 wherein the sealing lip is arranged on a sealing element which can be inserted into the tank filling tube.

5. A motor vehicle tank according to claim 4 wherein the sealing element comprises a one-part structure.

6. A motor vehicle tank according to claim 1, wherein the closing arrangement includes two annular sealing lips which are spaced from each other and which sealingly engage the pump nozzle and wherein the vent orifice is located between the sealing lips.

7. A motor vehicle tank according to claim 6, wherein the sealing lips are arranged on a sealing element which can be inserted into the tank filling tube.

8. A motor vehicle tank comprising:

a tank having a tank filling tube with a vent orifice;

a connection line which connects the vent orifice with an upper portion of the tank and can be isolated from the tank filling tube; and a receptacle in the tank filling tube for a sealing element having at least one sealing lip which engages a pump nozzle introduced into the tank filling tube and including a second annular sealing lip which is arranged coaxially with and spaced at a distance from the at least one sealing lip and which, when a pump nozzle is be introduced into the tank filling tube neck, likewise sealingly engages the pump nozzle, and wherein the vent orifice is located between the sealing lips so as to seal off the vent orifice when the pump nozzle is introduced into the tank filling tube and to isolate the connection line from the tank filling tube.

9. A motor vehicle tank according to claim 8, wherein the sealing lip is annular.

* * * * *